(No Model.)
A. F. WALTER.
ATTACHMENT FOR PHOTOGRAPHERS' TRIPODS.
No. 590,636. Patented Sept. 28, 1897.
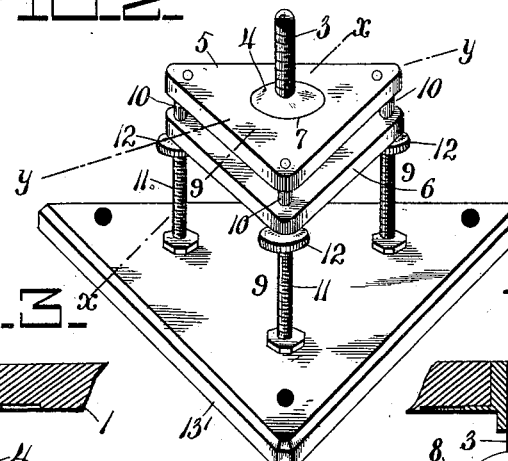
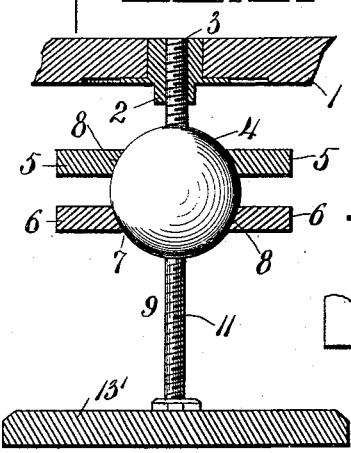
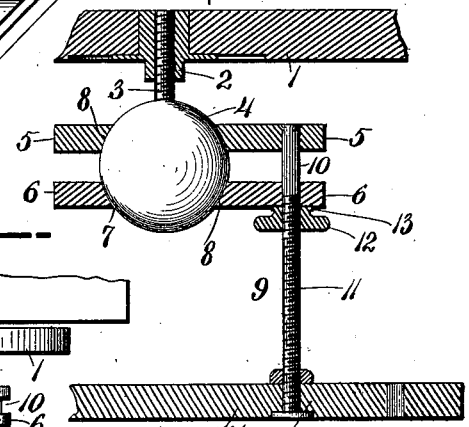
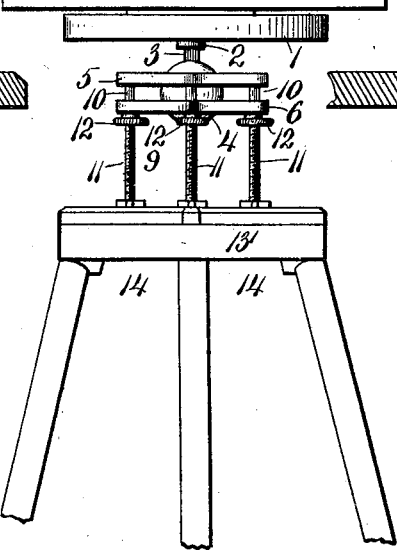
WITNESSES
W. E. Allen
INVENTOR
Albert F. Walter.
By John Wedderburn
Attorney
THE NORRIS PETERS CO., PHOTO-LITHO., WASHINGTON, D. C.

UNITED STATES PATENT OFFICE.

ALBERT F. WALTER, OF CHATSWORTH, ILLINOIS.

ATTACHMENT FOR PHOTOGRAPHERS' TRIPODS.

SPECIFICATION forming part of Letters Patent No. 590,636, dated September 28, 1897.

Application filed March 10, 1897. Serial No. 626,732. (No model.)

*To all whom it may concern:*

Be it known that I, ALBERT F. WALTER, a citizen of the United States, residing at Chatsworth, in the county of Livingston and State of Illinois, have invented certain new and useful Improvements in Attachments for Photographers' Tripods; and I do hereby declare the following to be a full, clear, and exact description of the invention, such as will enable others skilled in the art to which it appertains to make and use the same.

This invention relates to an attachment for a photographer's tripod, which is also equally applicable to theodolites, transits, levels, and other similar surveyors' instruments whose tripod-heads are provided with laterally-shiftable plates that enable a quick horizontal adjustment within a limited range.

The invention primarily consists of a universal joint or connection interposed between the top plate or head of a tripod or the base of a photographer's camera or surveyor's instrument, as the case may be, and of light and readily-adjustable construction.

The invention secondarily consists of the specific arrangement of the several parts, which will be more fully hereinafter described and claimed.

The object of the invention is to provide an adjustable attachment for a photographer's tripod for the purpose of squaring or leveling the camera with the object to be taken and without necessitating the movement of the legs of the tripod, as is usually required on rough ground and hilly sections.

In the drawings, wherein like numerals of reference are employed to designate similar parts, Figure 1 is a side elevation of a portion of a camera, showing the improved leveling attachment applied thereto. Fig. 2 is a detail perspective view of the improved leveling attachment. Fig. 3 is a transverse vertical section on the line $x\,x$ of Fig. 2. Fig. 4 is a transverse vertical section on the line $y\,y$ of Fig. 2.

Referring to the drawings, the numeral 1 represents a bed or table to which a camera-body or other instrument may be attached, and has in the center thereof a screw-collar 2, adapted to removably and adjustably receive a screw stem or shank 3, centrally extending from a spherical head or ball 4. The said spherical head or ball 4 is adjustably held in two separated triangular or other shaped plates 5 and 6, having central openings 7 with reversely-concaved walls, as at 8. The plates 5 and 6 engage the spherical head or ball 4, normally at points above and below the horizontal median plane of said head or ball, to thereby hold the latter in proper position and to insure rigidity of adjustment after the several parts of the mechanism have been manipulated as desired. The upper plate 5 has the upper ends of screw-standards 9 rigidly secured thereto. The said screw-standards have the upper portions adjacent to the said plate 5 formed of larger diameter and unthreaded, as at 10, for the purpose of permitting the lower plate 6, through which said screw-standards pass, to move thereover in the clamping operation against the spherical head or ball. The screw-threaded portions 11 of the said screw-standards are necessarily of smaller diameter than the openings in the lower plate 6, so as to permit the said latter plate to have free movement over the said screw-threaded portions when the parts are loosened or when being taken apart or assembled. On the said screw-standards are mounted clamping nuts or disks 12, having extended centers 13 for bearing against the under side of the plate 6 to hold said latter plate in adjusted position against the spherical head or ball and secure a camera or other instrument in adjusted position. The lower ends of the screw-standards are suitably attached to a head post or plate 13' of a tripod 14.

In operation the clamping-screws 12 are loosened sufficiently to permit the spherical head or ball to move in the plates 5 and 6, when the table or bed 1, supporting the camera or instrument, will be readily adjusted to the proper level or squared, when the said clamping-nuts are tightened and the camera or other instrument is held in its desired position without moving the legs of the tripod. The adjustment of the device is very simple and may be effected by simply operating one or two of the clamping-screws or all of the same, the latter operation being preferable, in order to avoid irregular wear or abrasion of the spherical head or ball and thereby maintaining its true circular surface.

It is obviously apparent that slight changes in the details of construction may be made without in the least departing from the nature or spirit of the invention.

Having thus described the invention, what is claimed as new is—

1. The combination of a bed having a screw-collar attached to the under side thereof, a spherical head or ball having an upwardly-extending screw-shank engaging said collar, a pair of plates adjacently arranged with an open space between them, the upper plate being stationary and the lower plate adjustable, and each provided with central openings with reversely-concaved walls to clamp against said head or ball, screw-standards engaging the corners of said plates and stationarily secured at their upper ends to the upper plate and over which the lower plate is freely movable, said standards having their upper portions enlarged and unscrewthreaded, and clamping-disks engaging the screw-threaded portions of the standards and adapted to bear against the under sides of the lower plate, substantially as described.

2. The combination with a tripod-head, of a stationary plate mounted thereover, a lower movable plate under said stationary plate, a spherical head or ball adapted to be engaged and held by said plates, and screw-standards with upper enlarged unscrewthreaded ends secured to the stationary plate and over which said lower plate is freely movable, and clamping devices engaging said screw-standards, substantially as described.

3. The combination with a tripod-head of an upper stationary plate, screw-standards fixed to the corners of said plate, a lower adjustable plate freely movable over said standards, a clear space being formed between said plates, each plate being provided with an opening, and a spherical head or ball mounted between and adapted to be clamped by said plates, substantially as described.

In testimony whereof I have signed this specification in the presence of two subscribing witnesses.

ALBERT F. WALTER.

Witnesses:
  THOMAS Y. BROWN,
  EDWARD M. REISING.